Aug. 15, 1933. R. B. PARKER 1,922,321
METHOD OF EXTRACTING THE VOLATILE CONSTITUENTS FROM CARBONACEOUS MATERIALS
Original Filed Dec. 14, 1926 9 Sheets-Sheet 2
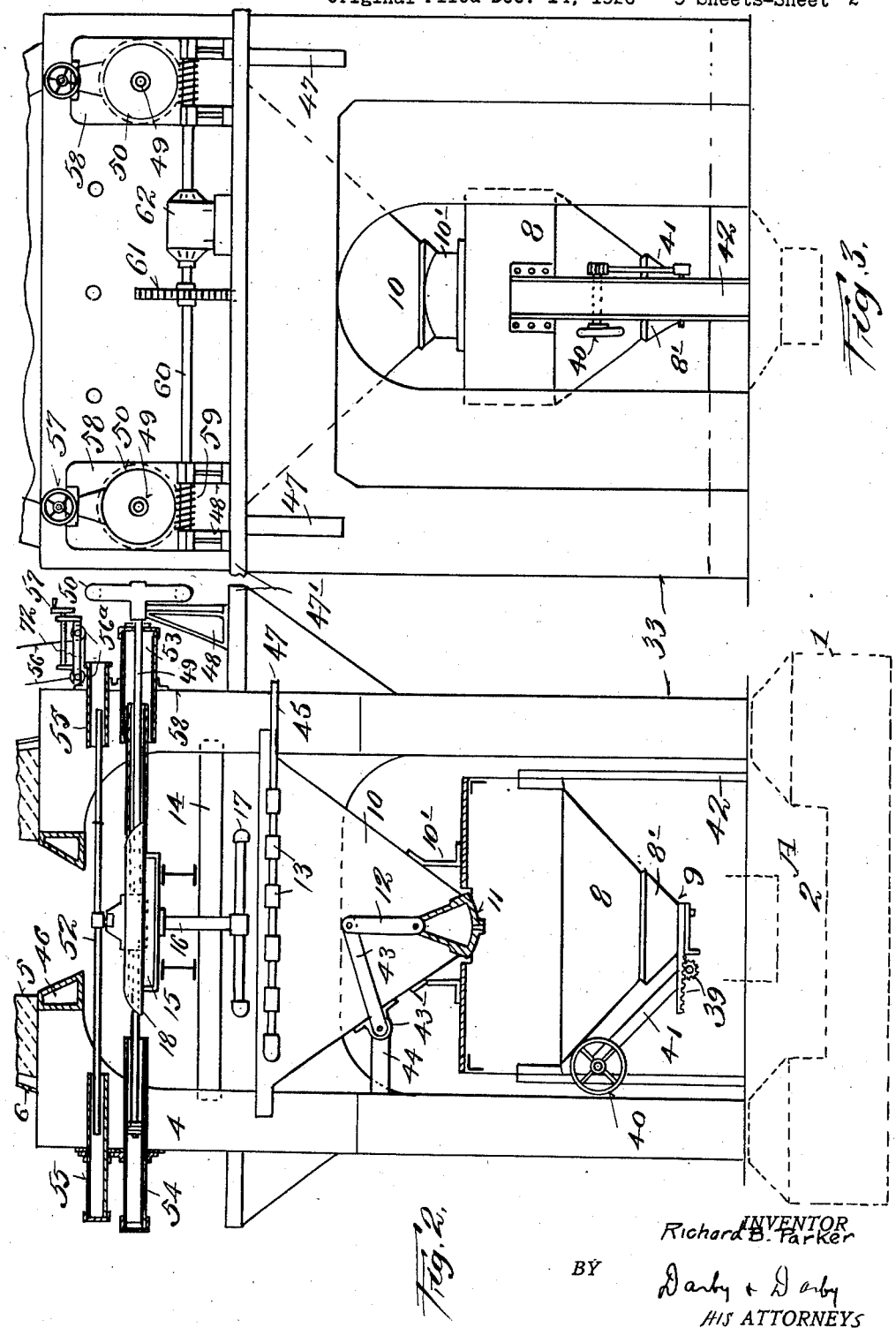
INVENTOR
Richard B. Parker
BY
Darby + Darby
HIS ATTORNEYS Aug. 15, 1933. R. B. PARKER 1,922,321
METHOD OF EXTRACTING THE VOLATILE CONSTITUENTS FROM CARBONACEOUS MATERIALS
Original Filed Dec. 14, 1926 9 Sheets-Sheet 3
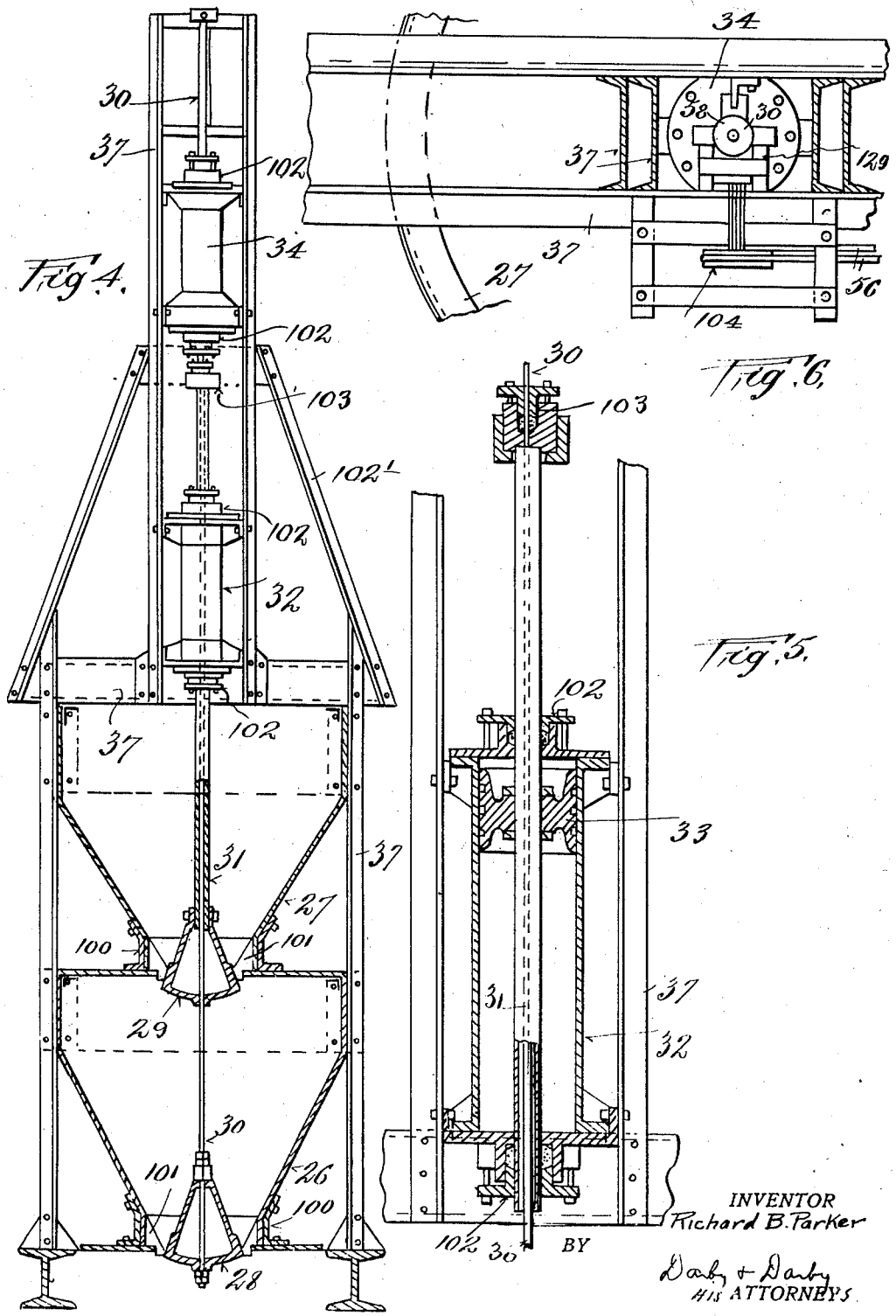
INVENTOR
Richard B. Parker
BY
Darby & Darby
HIS ATTORNEYS Aug. 15, 1933.   R. B. PARKER   1,922,321
METHOD OF EXTRACTING THE VOLATILE CONSTITUENTS FROM CARBONACEOUS MATERIALS
Original Filed Dec. 14, 1926    9 Sheets-Sheet 4
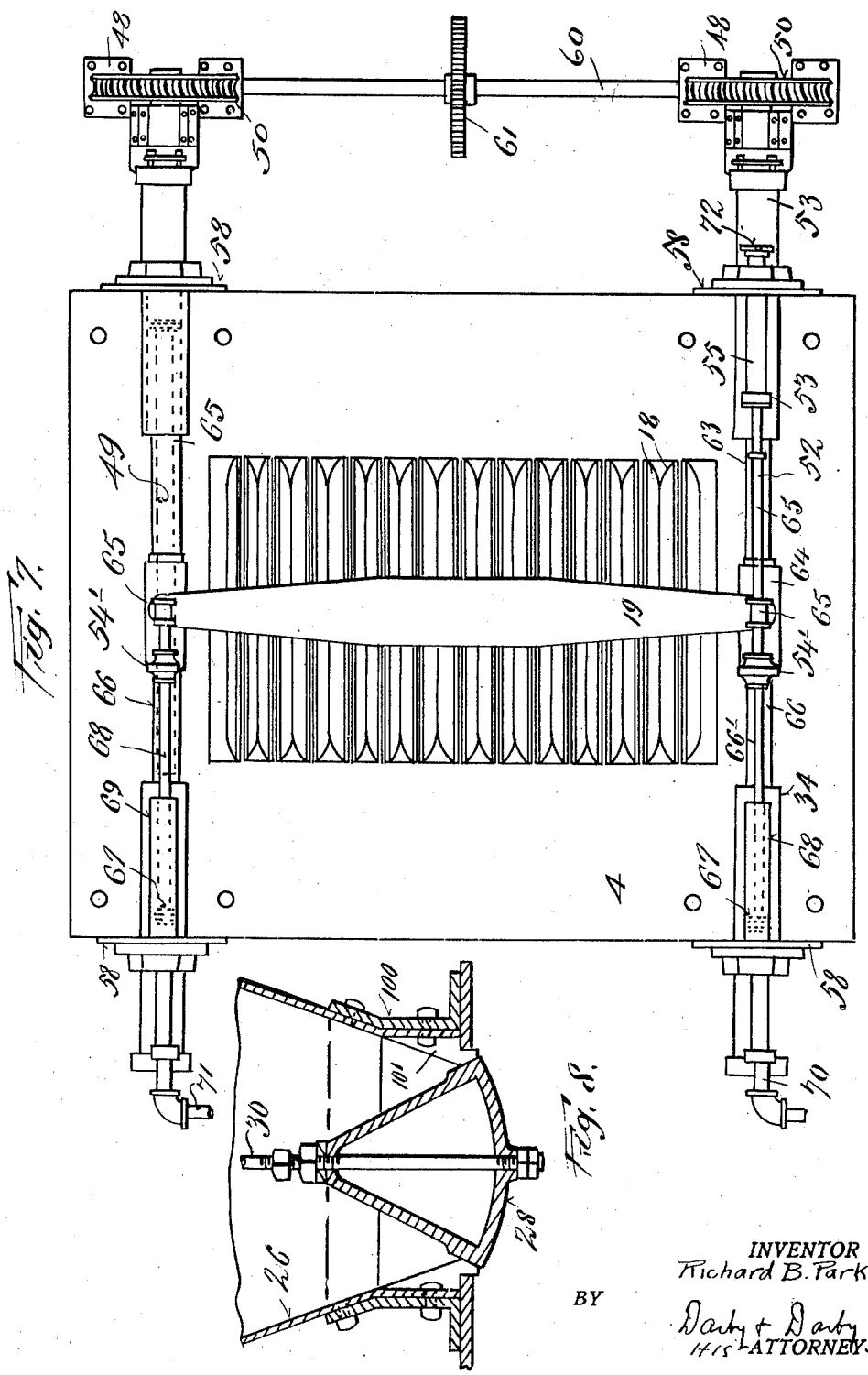
INVENTOR
Richard B. Parker
BY
Darby + Darby
HIS ATTORNEYS Aug. 15, 1933.  R. B. PARKER  1,922,321
METHOD OF EXTRACTING THE VOLATILE CONSTITUENTS FROM CARBONACEOUS MATERIALS
Original Filed Dec. 14, 1926    9 Sheets-Sheet 5
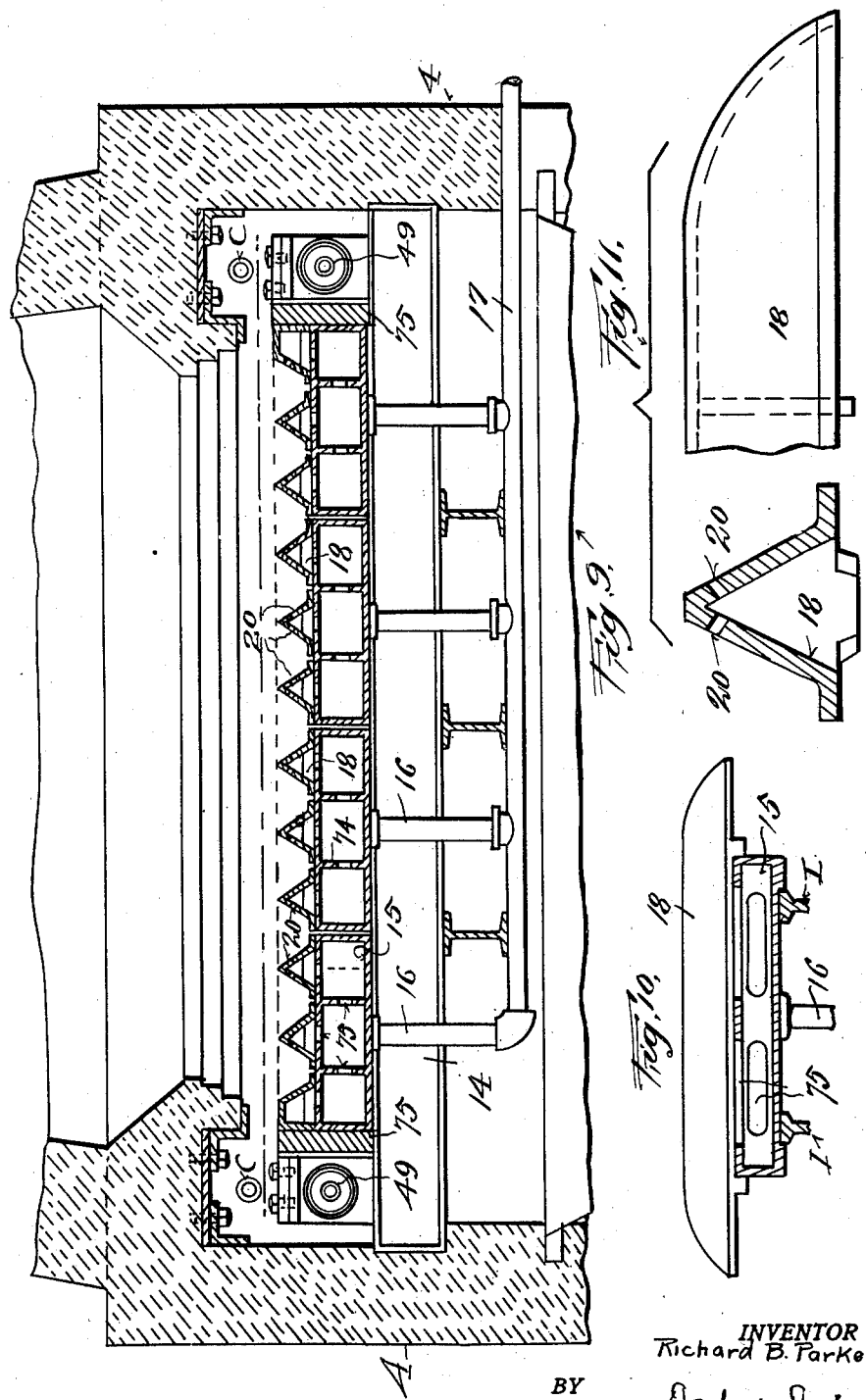
INVENTOR
Richard B. Parker
BY
Darby + Darby
HIS ATTORNEYS Aug. 15, 1933.                    R. B. PARKER                    1,922,321
         METHOD OF EXTRACTING THE VOLATILE CONSTITUENTS FROM CARBONACEOUS MATERIALS
                        Original Filed Dec. 14, 1926     9 Sheets-Sheet 6
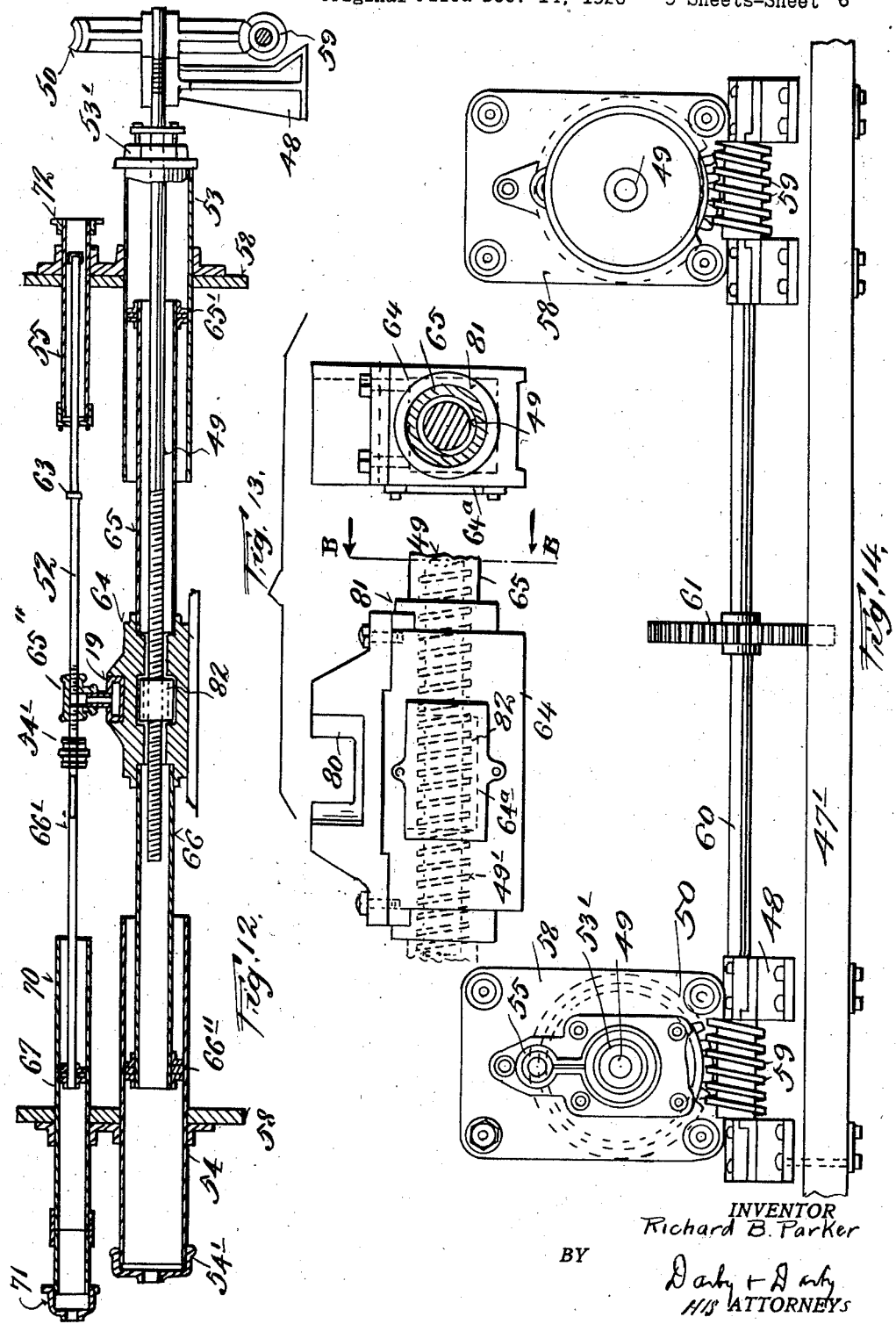
INVENTOR
Richard B. Parker
BY
Darby + Darby
HIS ATTORNEYS Aug. 15, 1933.  R. B. PARKER  1,922,321
METHOD OF EXTRACTING THE VOLATILE CONSTITUENTS FROM CARBONACEOUS MATERIALS
Original Filed Dec. 14, 1926   9 Sheets-Sheet 7
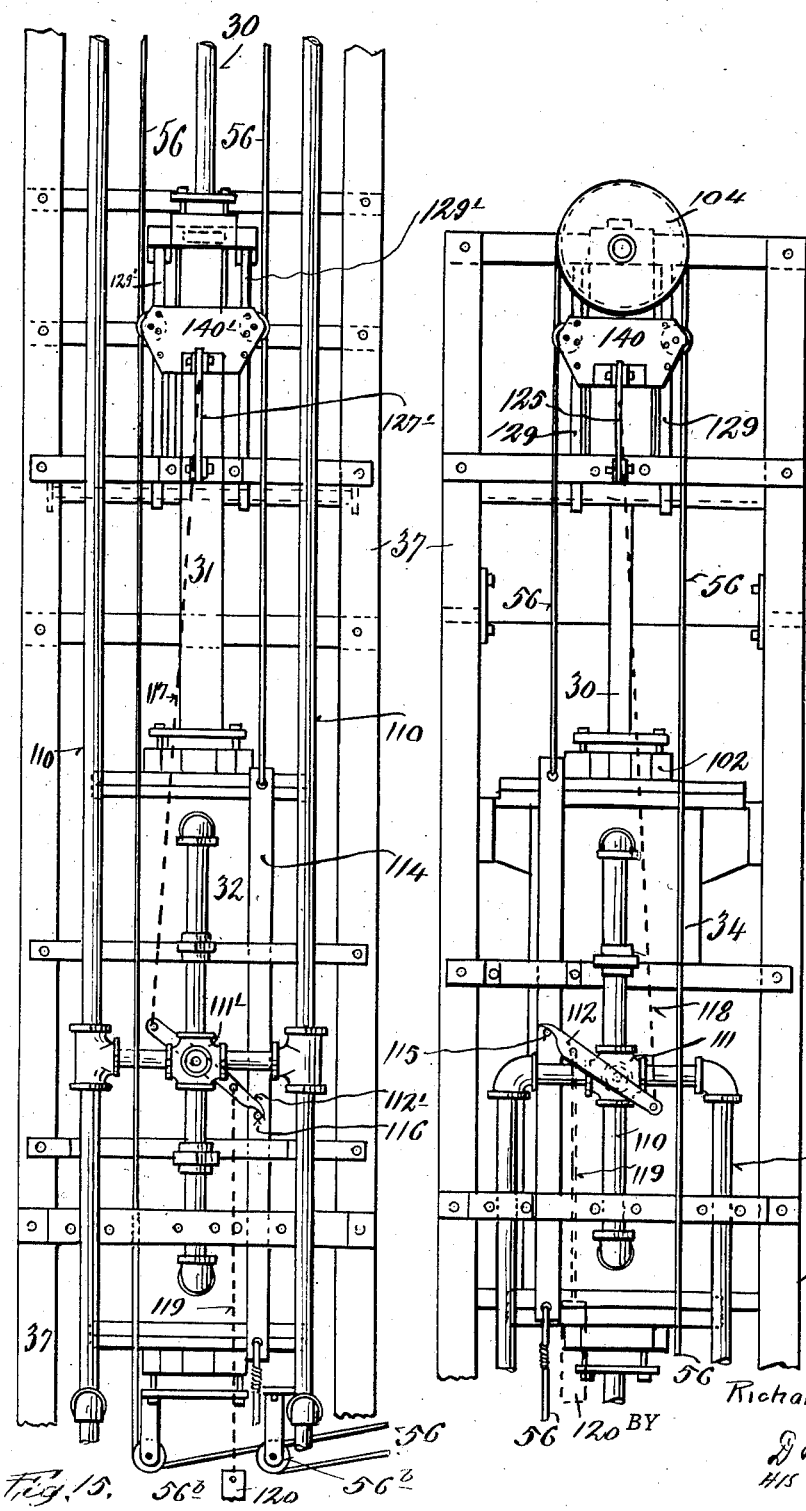

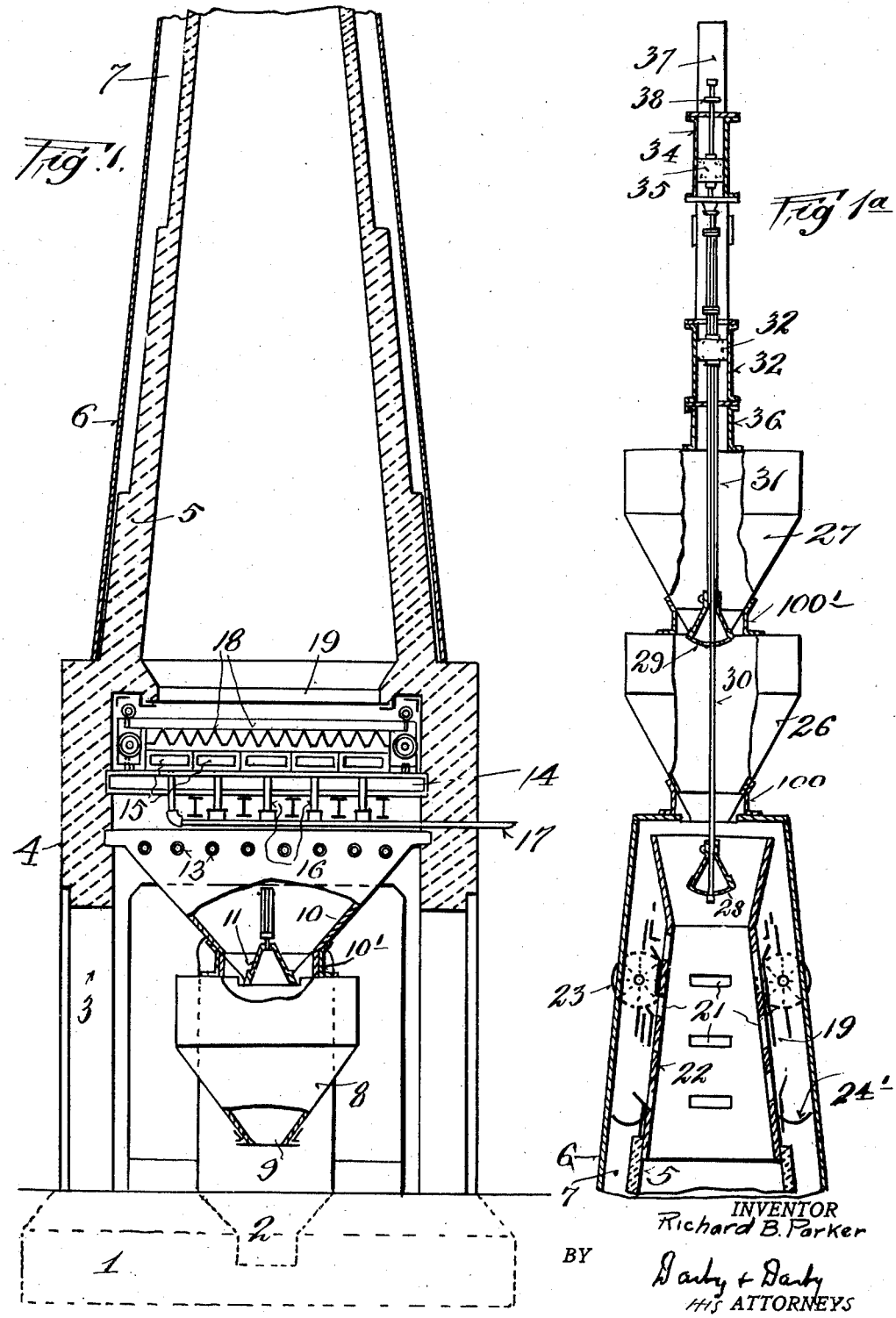

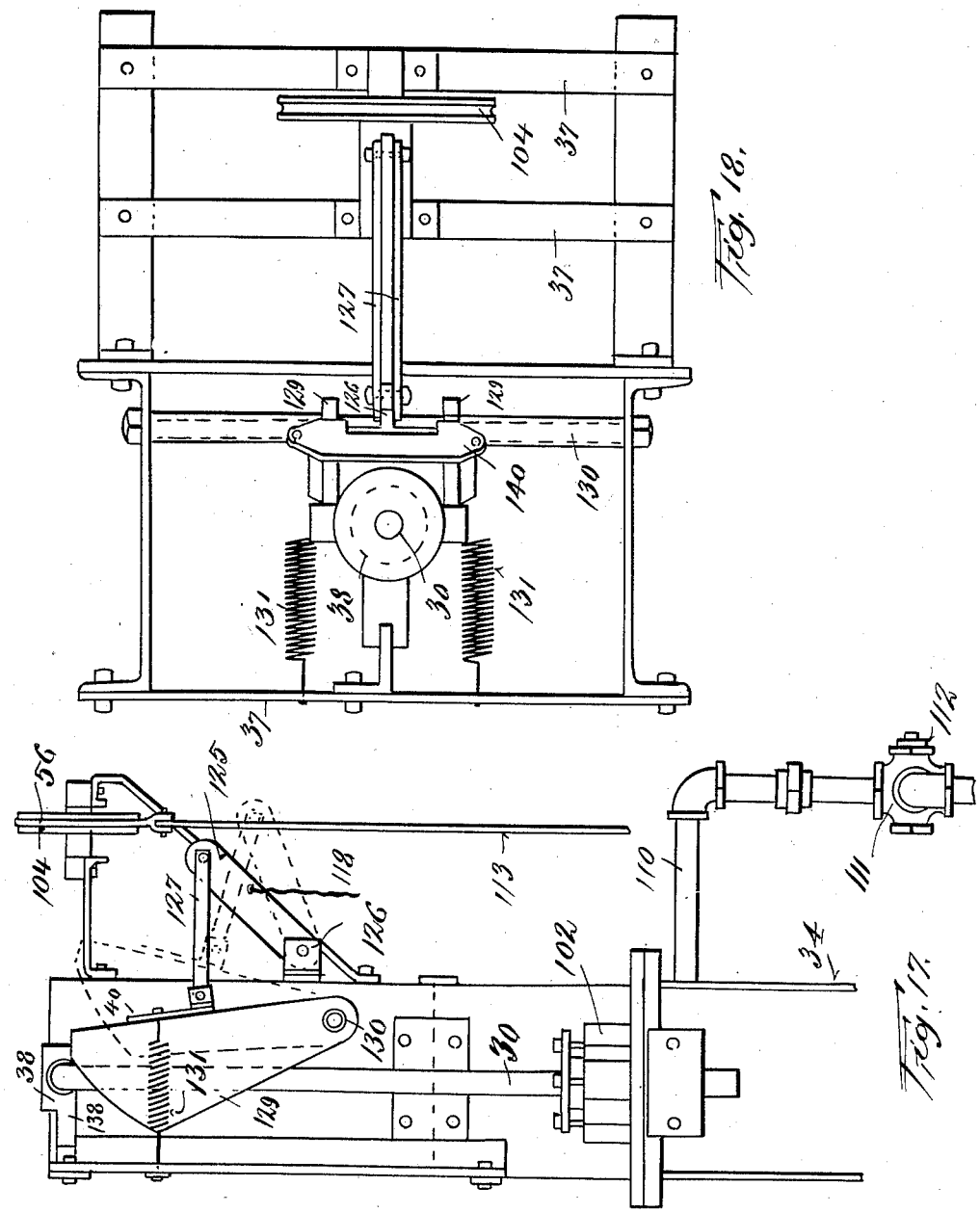

Aug. 15, 1933.    R. B. PARKER    1,922,321
METHOD OF EXTRACTING THE VOLATILE CONSTITUENTS FROM CARBONACEOUS MATERIALS
Original Filed Dec. 14, 1926    9 Sheets-Sheet 9
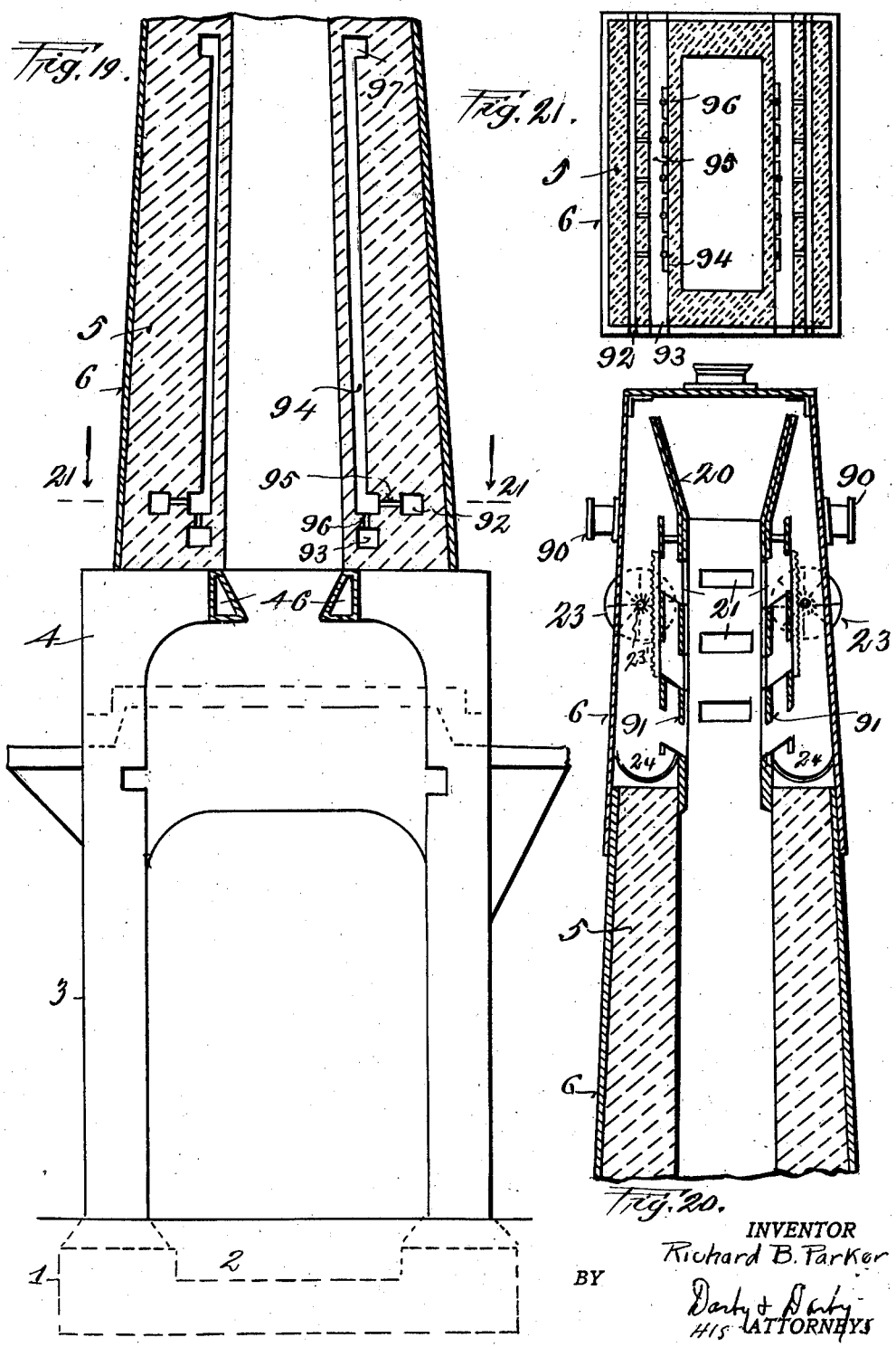
INVENTOR
Richard B. Parker
BY
Darby & Darby
HIS ATTORNEYS Patented Aug. 15, 1933

1,922,321

UNITED STATES PATENT OFFICE 1,922,321

METHOD OF EXTRACTING THE VOLATILE CONSTITUENTS FROM CARBONACEOUS MATERIALS

Richard B. Parker, Englewood, N. J., assignor to Samuel E. Darby, trustee, New York, N. Y.

Application December 14, 1926, Serial No. 154,695. Renewed June 29, 1933

2 Claims. (Cl. 202—6)

This invention relates to the method of treating carbonaceous material for the recovery of the volatile hydrocarbon constituents thereof employing the apparatus claimed in my copending application Serial No. 154,694, filed December 14, 1926.

One of the objects of this invention is the provision of a method of treating carbonaceous fuels in which the fuel is fed to a retort and at the same time the residue is removed therefrom.

Another object of the invention is the provision of a method of treating carbonaceous fuels in which fresh fuel is fed to the retort without exposing the contents of the retort to the atmosphere.

Another object of this invention is the provision of a method of treating carbonaceous fuels in which gas is fed to the fuel bed at any desired point thereof and at any desired pressure in order to overcome channeling and the resultant gases are removed from the top of the fuel bed at any desired horizontal or vertical action to prevent channeling.

Another object of this invention is the provision of a method of treating carbonaceous fuels in which the fuel is provided in the form of a deep bed maintained near the bottom in a state of combustion so that the natural constituents of the fuel may flow upwardly through the bed, be condensed in the cooler parts thereof, and flow back to the hotter parts where they are revolatilized.

A further object of the invention is the provision of a method of treating carbonaceous fuels in deep beds in which the fuel is subjected to heat treatment and the residue is removed from the bottom of the bed in thin layers at the same time that the base of the bed is continuously stirred to prevent channeling of the freed gases.

A still further object of the invention is the provision of a method of treating carbonaceous fuels in deep beds to remove the volatile constituents thereof which prevents channeling by controlling the point of removal of the volatile constituents from the bed and permits of controlling the amount or degree of reflux of the cooled gases as they flow through the cooler portions of the bed and to control the quality of the coke or residue produced.

Another object of the invention is the provision of a method of the above type involving the step of cooling the residue as it is removed from the base of the bed by quenching so that the steam generated during this variation may pass up through the bed of the retort to aid in the distillation process by assisting in the removal of the oils distilled at lower temperatures than is possible without the introduction of this steam.

A still further object of this invention is the provision of the step of providing additional heating means by flowing heated gases through the walls of the retort to maintain the temperature within the retort uniform.

The general object of the invention is to provide a simple, efficient, practical and economical method for treating carbonaceous material such as coal, shale, lignite, or the like, for the recovery of the volatile hydrocarbon constituents thereof.

The invention resides substantially in the steps and combination of steps, all as will be more fully set forth hereinafter.

One of the difficulties heretofore experienced in commercial practice, in the treatment of carbonaceous material for the recovery of the hydrocarbon constituents thereof, is the inability to handle and operate that character, quality, and grade of carbonaceous material which contains the higher volatiles because of the tendency of such material, while in the process of treatment, to flux or agglomerate into a solid or solidified pitch-like mass within the heating chamber in which the treatment is carried on. Such fluxing or agglomeration prevents the effective passage of air or gas through the mass. Various expedients have been resorted to, in practice, in the attempt to overcome this objection. According to one proposed plan, the carbonaceous material is treated in comparatively small quantities and in thin layers. This has not proved to be satisfactory. Other expedients have also been attempted, in the effort to overcome or remove the difficulty, and to prevent or minimize the effect of the formation of such masses, but without substantial success so far as I am aware. Among the causes which contribute to the formation of such solid masses within the body of the material under treatment, particularly in the apparatus most generally employed commercially, may be mentioned the fact that the carbonaceous material to be treated is ordinarily maintained as a stationary mass during the recovery or extraction operation. When the material while so maintained as a stationary mass is subjected to the action of the extracting heat, such material agglomerates or solidifies or forms into a pitch-like condition of hard solid material which sticks to the walls or inner side of the extraction chamber, prevents the effective passage of heated gases through the mass of material under treatment, and clogs and arrests the extraction action. This in commercial practice has proved to be a source of serious difficulty and has resulted in preventing the effective recovery of the volatiles from that class of carbonaceous material known as the "higher volatile" coals, such, for example, as bituminous coking coals, and has prevented the use of such higher volatile material for extraction purposes.

For brevity of description, I will hereinafter refer to the raw material to be treated as "coal", intending, however, to include thereby any suitable carbonaceous material such as coal, shale, lignite, or the like; and by "higher volatile" coal I desire to include coal of that quality and grade which contains, say, from twenty-three per cent upwards of volatile constituents. I desire, however, to reserve a fair measure of latitude as to the lower limit of percentage of volatiles as this factor varies with different grades of coal ordinarily referred to as the "higher volatile" coal.

While it has long been sought to effect the treatment of coal for the recovery of the volatiles contained therein by the use of low temperatures, practical commercial success has not attended the efforts made in this direction, and the use of apparatus proposed therefor has not proved satisfactory, economical nor efficient. In the practical commercial apparatus comparatively high temperatures have been heretofore ordinarily employed and required. These temperatures run usually around 2000° F., more or less. When the volatile constituents of carbonaceous materials are suddenly subjected to such high temperatures chemical changes take place in the extracted volatiles or distillates resulting in the production of a lesser quantity of condensible oils and a higher percentage of permanent fixed gases such as hydrogen and methane. The oils produced are largely of the heavier grades, known as coal tars, which on redistillation yield higher percentages of pitch and other less valuable products than are recoverable from the oils obtained from carbonaceous materials by distillation processes employing lower temperatures. In other words, according to the apparatus heretofore used commercially, and which have been the most successful, high temperatures are employed in the extracting or distilling operation, resulting in the production of a smaller total yields of oils, of less value, such as coal tar, the lighter, more valuable oils being broken down by the high temperatures used in common practice, into heavier oils of different chemical composition and permanent fixed gases such as hydrogen and methane, etc.

Because of the high temperatures and the intermittent charging and discharging of the apparatus heretofore most generally used in commercial practice, it has been found impractical to use large units capable of handling large quantities of coal; difficulties have resulted due to mechanical stresses and strains developed in the feeding and delivery devices employed and required for the material under treatment, and to the sudden and violent change in temperature caused by the necessity of filling the distillation chamber when it is at its maximum temperature, with cold, raw material at approximately atmospheric temperature; the cost of construction, installation and upkeep of the apparatus has been very large; much valuable time has been consumed in shutting down the furnaces for repairs, for recharging and discharge; and expensive and complicated quenching devices frequently have been required for quenching the mass of discharged product due to the ignition thereof upon being exposed to the oxygen of the outer air.

For these and other practical reasons the units heretofore employed have been limited in size and capacity, and hence the daily quantity of material handled has been thereby materially prescribed and the output of recovered products limited, thereby enormously increasing the operating costs.

It is among the special purposes of my present invention to avoid these and other difficulties and to provide an apparatus for treating carbonaceous material, whether of the higher volatile class or of the lower volatile class, for the extraction and recovery of the volatile constituents thereof, which is simple, practical, efficient and economical.

In carrying out my invention I propose to subject the freshly charged raw material first to a temperature only slightly above the boiling point of water, then gradually advancing the charge, in a practically continuous manner, into successive zones of gradually increasing temperature, until it reaches a temperature of about 800 degrees Fahrenheit; at which temperature the greater part of the oil producing volatile constituents have been or will be removed together with the gases evolved with them, and will have been withdrawn from higher temperatures than those at which they were evolved. In this manner I avoid the breaking down, or as it is generally termed, cracking of the oil vapors evolved, and the consequent change in their chemical composition, which change occurs in the common high temperature processes of distilling coal in coke ovens or gas retorts in the manufacture of coke and gas.

I propose in accordance with my invention to advance the carbonaceous residue, forward or downward, toward the discharge mechanism, passing it through a combustion zone, in which zone the gases necessary for combustion are introduced or evolved, as may be expedient, for the purpose of supplying the heat required for the distillation of the material under process, and to cause the products of this combustion to pass through the superimposed and or advancing mass of the material under treatment within the distillation chamber. I also propose to continuously remove the carbonaceous residue from the bottom or end of the combustion zone, and at the same time supply material from the superposed charge to take the place of the removed residue, and to supply fresh raw material to the top of the pile of material superposed on the material in the combustion zone. By means of my apparatus, the continuous movement of the ejecting device over the surface of the grates is utilized to operate the double hopper air lock at the top of the retort to feed and force the fresh fuel into the top of the retort without opening it to the atmosphere, in a practically continuous manner, and by suitable regulating and controlling the heat generation and the passage of the heated gases and vapor through the mass, the material is subjected during its progression to an increasing temperature from the point of its admission to the chamber where the treatment is carried out, to the point where the maximum extracting heat is attained, at which point the extracting action is completed.

It has been found in actual practice that the volatile matters traveling upwardly through the relatively large mass of material, tend to follow the path of least resistance, and produce the effect known in the art as channeling. I provide as one of the elements of my invention, a series of openings on each side of the retort near the top, and gates controllable at will, so that any desired opening may be uncovered, and on any side of the retort. By means of this arrangement, the gases may be drawn off at any desired point near the top of the retort, and the effective channeling may be greatly decreased.

Since these openings are placed at different points vertically of the retort wall, the height of the column through which all or part of the gases must travel may be increased or diminished. The greater the depth of the fuel pile through which the gases must travel, the more the gases will be cooled, and it has been found in practice that some of the less easily volatilized oils and resins condense in the relatively cooler fuel near the top of the retort, and flow back towards the heated portion of the charge. This is known as refluxing, and when properly controlled, produces a purifying and scrubbing action of the condensed vapors, and upon revolatilization, produces purer products. It will thus be seen that two valuable functions are performed by the openings at the top of the retort, namely the prevention of channeling, and the control of the refluxing action.

I also propose, in accordance with my invention, to distribute at any desired point of the grate, a gas such as air, carbon dioxide, steam, or some of the gases produced in the retort, or any combination of them, to aid in maintaining the desired temperature within the combustion zone above the grate. If desired, these gases may even be superheated.

I also secure a more readily controllable temperature within the retort by burning suitable gases in the passages within the walls of the retort, so that the fluctuation of temperature within the retort may be prevented.

The volatiles driven off from the mass of material under treatment at the various temperature zones, are withdrawn together, and subjected to the various stages of condensation and refining required for the purpose of collecting and recovering the values. In other words, I propose, in accordance with my invention to provide means whereby a combustion zone is formed within and at the bottom or base of a stack or pile of material to be treated, such combustion zone being formed within the material itself, after the extracting action thereon has been completed. The carbonaceous residue within this combustion zone supports and carries the weight of the superposed stack or pile of the material, the residue being ejected or removed from the bottom of the combustion zone, and coincidentally fresh material being supplied from the top as the mass progresses through the various stages of treatment.

I also propose, in accordance with my invention, to provide means to carry on the extracting and recovery operation continuously, and, to this end, to withdraw the vapors as the volatiles are driven off from the material, and to maintain the mass of material under treatment in continuous progression, thereby preventing the formation of bridges or agglomerated or solidified masses within the body of the material under treatment. I also propose, in accordance with my invention, to effect the extraction and recovery of the crude oil content of the coal instead of coal tar. That is to say, by effecting the extraction of volatiles at temperatures below the cracking temperatures of oil the recovery of the volatiles of the coal is accomplished with the least possible chemical change therein through the heat to which they are subjected in the extraction and recovery operation.

I also propose, in accordance with my invention, to provide a structure having a large daily capacity per unit of the material handled, thereby vastly increasing the amount of extracted products obtainable per unit. I also provide a structure, the initial cost of construction and installation of which, and the cost of maintenance, upkeep and repair, are enormously reduced, and wherein a greatly increased percentage of the crude oil volatiles of the higher commercial values are recovered even when employing the lower volatile coals, and wherein a higher volatile coal may be extracted with equal facility as in the case of lower volatile coal, a result which has not heretofore been successfully accomplished commercially.

I have found that I am able to accomplish my objects and purposes by employing means for producing within the retort, isothermic zones of approximately uniform temperature, having the general form of parallel curved lines, tangents to any point of which are at right angles with the direction of flow of the material at that point, and thereby subjecting the material under treatment in any such isothermic zone to the same temperature at any given instant of time; for subjecting all particles of material within such isothermic zone at a given instant of time to the same extent of extracting action; for subjecting all particles of material in the same isothermic zone at a given instant of time, to a substantially uniform degree of pressure and progression; for maintaining a substantially uniform degree of heat generation within the combustion zone and employed at all times in any given isothermic zone, in any given instant of time; for effecting the removal of the carbonaceous residue, and coincidentally therewith supplying fresh material; for efficiently controlling and maintaining uniformity of the heat used at the various stages or zones of extracting action per unit of time; for maintaining a substantially constant maximum heat in the successive extracting zones through which the material by its progression is carried, thereby effecting a more rapid extraction action; for regulating the removal of carbonaceous residue and the supply of fresh material according to the maximum temperature to which the extraction operation is carried on; and for the use of low temperatures with all the resultant advantages thereof.

Referring to the drawings, in which the same reference numerals will be used throughout the several views to indicate the same or similar parts, Fig. 1 is a vertical, cross-sectional view of the lower portion of a retort embodying my improvements.

Fig. 1 A is a vertical sectional view of the upper portion of the retort, and a side elevational view with some parts broken away, of the feed hoppers provided at the top of the retort.

Fig. 2 is a vertical cross-sectional view at right angles to the view in Fig. 1, of the base of the retort, and its foundations.

Fig. 3 is a side elevational view taken at right angles to that of Fig. 2.

Fig. 4 is a vertical cross-sectional view of the feed hoppers and supporting structure.

Fig. 5 is an enlarged, cross-sectional view of one of the cylinders for controlling the feed hopper valve.

Fig. 6 is a top plan view of Fig. 4, with many parts broken away.

Fig. 7 is a top plan view of the grate and the cutter or ejector bar mechanism.

Fig. 8 is an enlarged cross-sectional view of the bell valve and its seat as used in the several hoppers forming part of this invention.

Fig. 9 is an enlarged cross-sectional view of the grate bars and the gas distributing boxes therefor.

Fig. 10 is a cross sectional view of one of the gas boxes showing how a grate bar is supported thereon.

Fig. 11 shows two views of the grate bar construction.

Fig. 12 is a vertical cross-sectional view of the mechanism for driving the cutter bar and the means used for cooling the cutter bar and driving mechanism.

Fig. 13 is a side elevational and end elevational view of one of the carriages for carrying the cutter bar.

Fig. 14 is an enlarged detailed view of the cutter bar driving mechanism.

Figs. 15 and 16, taken together, represent the side elevational view of the mechanism for operating the feed valves.

Fig. 17 is an enlarged side elevational view of the trip mechanism.

Fig. 18 is a top plan view of the apparatus of Fig. 17.

Fig. 19 is a view partly in elevation, and partly in cross-section, of the lower portion of the retort showing the combustion chambers of the walls of the retort.

Fig. 20 is a cross-sectional view of the upper half of the retort of Fig. 19, showing the distributed openings near the top of the retort, and the mechainsm for controlling them.

Fig. 21 is a cross-sectional view, taken on the line 21—21 of Fig. 19, looking in the direction of the arrows.

In Figs. 1 and 1 A, the foundation for the retort is shown at 1, provided with a channel to receive a continuous conveying mechanism for the removal of the finished coke or other residue. Upon the foundation 1 is the concrete supporting structure 3, for the grate chamber 4, upon which is superposed the fire walls of the retort 5. A protecting shell of sheet steel or iron is provided about the fire walls 5, which are stepped back progressively towards the top to provide the space 7, which may be filled with sand or any suitable heat insulator. It is, of course, understood that the combustion chamber and walls of the retort are to be constructed of any suitable heat resisting material such as fire brick, and the like. Supported under the retort is a hopper 8, having a gate 9 at the bottom thereof. This hopper is supported on a suitable framework 42, (Figs. 2 and 3), and in turn supports thereon a collar 10' to receive a second hopper 10, having a conical valve 11 at the bottom thereof. The hopper 10 is also embedded in the walls of the retort support. The layers 12 form part of the mechanism for operating the valve 11, as will be described later. A series of horizontally disposed pipes 13, having a plurality of openings in the walls thereof, are suitably spaced at the top of the hopper 10, to provide a water spray for use in the quenching operation of the hot residue delivered from the grates. Supported by the walls 4, are the steel beams 14, upon which rest a plurality of gas boxes 15, having the pipe inlets 16 connected in parallel to the main gas line 17. The grate bars 18 are supported on these gas boxes as will be described more fully hereinafter. The cutter bar 19 is arranged to move progressively back and forth over the surface of the grate bars, to force the residue from the grate at each side into hopper 10.

The tapered element 20, which may be formed integral with the walls 5 of the retort, is provided with a plurality of vertically disposed openings 21, which occur on all sides thereof. A movable gate or shutter arrangement 22, slides over the openings to provide a means for their control. These shutters are operated by the hand wheels 23, as will be disclosed later. A space 24, provided by the top of the steel casing and the elements 24', is maintained at a pressure below atmospheric, so that the gases are drawn therein through the openings 21, and thence to the gas receivers by means of suction pumps.

Supported on the top of the retort, is the hopper 26, retained thereby means of the ring 100, and which, in turn, supports the hopper 27, retained in place by the ring 100'. On a vertically movable shaft 30, there is secured the valve 28, for closing the lower hopper and on a vertically movable shaft 31, encircling the shaft 30, is a tubular member for controlling the valve 29 of the hopper 27. This piston 33, within the cylinder 32, operates the valve 29, and the piston 35 within the cylinder 34, operates the valve 28. The piston structure is supported by means of the framework 36 and 37 to be described later. A catch device 38 is attached to the rod 30 for a purpose to be described hereinafter. It is to be noted in connection with the double hopper arrangement, that the only communication possible between the interior of the retort and the atmosphere, would be through the two valve openings, since the top of the retort and the top of the hopper 26 are completely closed off. In the operation of the apparatus, however, valve 28 is never opened until the valve 29 is closed, so that the retort is never truly open to the atmosphere, although in practical operation, the device may not be absolutely hermetically sealed. In Figs. 2 and 3, the lower hopper 11 is shown supported by the channel beams 42. The hand wheel 40 operates the gate 9 through the rod 41 and the rack and gear 39. The gate 9 moves in suitable guides in the seat 8', as is shown in Fig. 2. The valve 11 is controlled by means of the levers 12 and 43. The lever 43 is secured to a shaft rotatably mounted in the bracket 43', and rotated by means of the lever 44. The horizontally extending pipes 13, at the top of the hopper 10, are joined together at one end by means of the supply pipe 45. A platform 47', braced by the brackets 47, provides means for supporting the cutter bar driving mechanism. Bearings 48 serve to support the worm rods 40, which will be described more fully hereinafter. Large worm wheels 50 are provided on these shafts, as shown. The carriages 51, for carrying the cutter bar, are caused to reciprocate back and forth by the rods 49, in a manner to be described. The pipe 52 furnishes a supply of cooling water to the cutter bar. The cylinders 53, 54 and 55 have a purpose to be described in connection with a later figure. The water cooled cutting edges 46, supplied at the base of the retort, aid in breaking, by cooperation with the cutter bar, any masses which may form. The cylinders 53, 54 and 55 are supported in movable plates 58, secured to the side walls 4. The worm wheels 50 are driven by means of the worm 59 keyed to the shaft 46, which is rotated by means of the gears 61 and the electric motor 62. The outlet is 71. The rod 52, secured to the other side of the T 65 is solid, and has mounted thereon, a collar 64 adapted on motion to the right of Fig. 7, to engage with the cylinder 55, to cause it to slide towards the right for a purpose to be described later.

In Fig. 8 is shown an enlarged cross-sectional view of one of the bell valves and its seat. The hopper 26, is secured in the ring 100, which serves as a supporting seat therefor. Secured at the opening to the mouth of the hopper, is a ring 101, made of chilled steel, or other suitable material having a chilled cutting edge, against which the raised portion 28', of the valve 28, is to seat. The raised portion 28' is roughened, so that any fuel which may get between it and the seat will tend to be rolled out as the valve seats. Should any of the fuel wedge between the valve and its seat, it will be crushed and forced out as the valve becomes seated. I also propose in one form of my invention, to provide a mechanism which will cause the valve 28 to have a rotary motion as it approaches its seat, so as to further aid the grinding and crushing action as the valve seats, and to aid in rolling the fuel from between the seat and the valve.

In Fig. 9 is shown more clearly, the construction of the gas distributing boxes and the grate mechanism. The gas boxes 15, are shown seated on the supporting beams 14, and comprise a plurality of compartments as shown. The walls 74 which form the compartments and the tops of the gas boxes are provided with openings 75, to permit the ready movement of gas. The grates consist of a plurality of hollow V-shaped bars 19, one disposed over each compartment of the gas boxes. Small holes 20 are provided near the apex of the grate bar, as shown. The pipe 16 communicates with each of the gas boxes, and are all connected together in parallel to the main gas line 17. Fire walls 75 are provided at each end of the grate, which cooperate with the chamber walls 4, to provide the spaces C, in which the mechanism for causing the cutter bar to reciprocate back and forth, is mounted. By means of this construction direct contact with this mechanism with the heat generated in the fuel bed on the grate is prevented. I also propose in one form of my invention, to provide simple jacks mounted under the beams 14, to provide vertical adjustment of the hollow grate structure. By this arrangement, the distance between the grates and the base of the retort may be varied. I have found in actual operation of my device that by varying the vertical position of the grates, with respect to the base of the retort, that the size of the coke or residue produced, may be varied at will. Since the shafts 49, which drive the cutter bar back and forth, project through the exterior walls of chamber 4, I propose to provide for this vertical movement by so mounting the plates 58 that they may be adjusted vertically with respect to the side walls of the retort. In Figs. 10 and 11 are shown enlarged views of the gas boxes, and grate bars. By means of suitable valves in the pipes 16 and 17, it is possible to deliver any desired gas to any point in the fuel bed to aid in the combustion and production of volatile gases. I, of course, am aware that changes may be made in the construction of these boxes and the piping, so that relatively limited areas may be supplied with the gas. I have also found that by delivering gas at a suitable point through the gate, I may somewhat control the undesirable action of channeling.

The method of cooling the ejector bar apparatus is clearly shown in Fig. 12. The plates 58 are clamped to the side walls of the retort as shown in the other figures. The threaded rod or shaft 49 is journaled at one end in the bracket 48, and has secured on one end, the worm wheel 50, which is driven by the worm 59. A nut 82 rides back and forth on the threaded rod 49, and carries with it the carriage 64. Secured to each side of the carriage 64 are the hollow piston rods or cylinders 65 and 66, having on their ends the pistons 65' and 66' respectively. These pistons move in the cylinders 53, and 54 respectively. The cylinder 53 has mounted on its end the packing gland 53', in which the rod 49 rotates. A suitable cap 54' is secured to the free end of the cylinder 54. Secured in one of the plates 58 is the cylinder 70, having attached at one end a suitable cap 71'. The hollow pipe 66' has secured to its end the piston 67, adapted to slide in the cylinder 70, and is connected through the union 54' to the T 65'', which communicates with the hollow cutter bar 19. Secured to the other side of the T 65'' is a solid rod 52, having mounted thereon the collar 63. This rod slides in the cylinder 55, until the collar 63 strikes the cylinder, when it is caused to move to the right, for a purpose to be described later. Cooling liquid is admitted through the cap 54', through the cylinder 54, cylinder 66 through the liquid tight carriage 64, cylinder 65 and into the cylinder 53. Thus as the carriage moves backwards and forwards, the cooling liquid can circulate through these passages, and is prevented from leaking to the outside by the pistons as shown. A similar action takes place in the cylinder 70, where the liquid passes through the pipe 66', and the cutter bar 19, and out through a corresponding structure at the other end of the cutter bar. Thus the motion of the carriage and its connected apparatus results in the circulation of cooling liquid to the parts of the mechanism intended to operate the cutter bar. As shown in Fig. 13, the carriage 64 has the socket 80 formed therein to receive one end of the cutter bar. A plate 64 A is provided for ready access to the interior of the carriage. The collars 81 at each end of the carriage, receive the cylinders 65 and 66.

In Fig. 14 is shown the assembly for driving the rods 49 as has already been clearly described.

Referring to Figs. 15, 16 and 1 A, I have shown the mechanisms for operating the two valves in the feed hoppers at the top of the retort. In Figs. 15 and 16, which must be taken together to show the complete apparatus, there is shown the framework 37, which supports therein the cylinder 32 and the cylinder 34. It will be noted that Fig. 16 is a continuation of Fig. 15. The cylinders are provided with the four-way valves 111' and 111, which have attached to their stems the levers 112' and 112. The piping 110, which has been designated by this number, is adapted to admit fluid pressure to either side of the piston within the cylinder in each case, depending upon the position of the four-way valve. This will be readily apparent to anyone skilled in the art, and a detailed description will not be given here. One end of the levers 112' and 112 has mounted thereon, by means of the rope or wire 119, a weight 120, adapted to retain the lever with its pointed end in a downward position as shown in Fig. 15. The ropes 56 pass over the large pulley 104 at the top of the structure, and down to the pulleys 56b and thence over the pulleys 56a (see Fig. 2).

These ropes have inserted therein, the bars 113 and 114, which have mounted thereon the pins 115 and 116. The other free ends of the levers 112' and 112 are attached by means of the wire or ropes 117 and 118 to the levers 125.

Referring to Figs. 17 and 18, it will be noted that the lever 125 is pivoted to the framework at 126, and is secured at its upper end by the line 127, by the pivot 128, to a pair of arms 129, pivotally mounted on the rod 130. The two arms 129 are secured together by the cross plate 140, on which the support for the pivot 128 is mounted. The springs 131 tend to maintain the pivoted arms to the left as shown in Fig. 17. When the shaft 30, on which the disk 38 and its projecting arms 138 are moved upwardly (the shaft 30 being in its normal position below the arms 129), the arms 138 gradually force the pivoted levers 129 to the right until the disk 38 rises to the position shown in Fig. 17, when it seats on the top of the levers 129, which have been drawn again to the right by the springs 131.

The operation of this mechanism is somewhat as follows:—Assuming that valve 29 is closed and valve 28 is open, as the carriage and its cutter bar moves to the right in Fig. 12, the collar 63 comes in contact with the cylinder 55, forcing it to the right, and the element 72, which has a notch therein in which the rope 56 rests (see Fig. 2), will cause the right hand rope in Fig. 2 to move upwardly. This motion is transmitted to the rope 56, by means of two adjustable buttons secured to the rope 56, one on each side of the member 72, as will be readily apparent from Fig. 2. The upper movement of the right hand rope will cause the bar 114 (Fig. 15) to move upwardly, carrying with it the lever 112' by reason of its contact with the pin 116. This admits fluid pressure to the top of cylinder 32, to force the piston 33 (Fig. 1 A) downwardly, so that the valve 29 opens and permits fuel to flow into the hopper 26. During this operation the valve 28 is closed. The other end of the cylinder 32 is free to exhaust through the pipes 110, as will be readily apparent to one skilled in the art. In the meantime, as the right hand end of the lever 112' rises upwardly, the other end will descend, and through the action of the rope or wire 117, cause the lever 125 to descend to the dotted position similar to that shown in Fig. 17, which draws the arms 129 to the right to the dotted position similar to that in Fig. 17. This releases the hollow shaft 34, so that it may descend as described.

As the bar 117 continues to move upwardly, lever 112' moves with it until its end slips past the pin 116 when the weight 120 on the end of the arm snaps it back to its lowermost position with the pointed end directed downward. This changes the position of the four-way valve to permit exhaust from the upper end, and the admission of pressure into the lower end of cylinder 32, causing the piston therein to move upwardly to close valve 29. Upon the reversal of the direction of movement of the cutter bar 19, rod 52 will travel to the left, and when its end engages with cylinder 55, it will also be drawn toward the left. The notched end of the cylinder will then engage the other button on the rope 56, to cause it to move in the opposite direction, so that the bar 113 will move upwardly. This will cause arm 112 to be raised with it, so that valve 111 will be set to admit fluid pressure to the top of cylinder 34, which causes piston 35 to descend and open the valve 28. Just before this action occurs, the movement of arm 112 will, through the action of the chain or rope 118, withdraw the arms 129 to the dotted position shown in Fig. 17, so as to release the disk 38 at the upper end of the shaft 30. As the valve 28 continues to descend, and the fresh fuel flows into the top of the retort around it, it will come in contact with the top of the pile, and will tend to force the material firmly into the retort, which will result in a more uniform density of the pile or column of material within the retort. During the time the valve 28 is open, valve 29 will be closed, so that the retort will not be open to the atmosphere. When the bar 113 has moved upwardly a sufficient distance, the pin 115 will slide out of contact with the arm 112, permitting it to be returned to its other position under the influence of the weight 120, attached thereto by means of the rope or wire 119. This will cause a resetting of the valve 111, to permit exhaust from the top of cylinder 34, and the admission of fluid pressure to the bottom thereof to cause piston 35 to travel upwardly and close the valve 28. As stated before, means may be provided to cause the rotation of the valves just as they are setting to aid in the removal of material from between the valves and their seats. As one possible form of this structure, I contemplate the use of a cam surface on the framework and a cam follower on the shaft to be rotated so that as the cam follower comes in contact with the cam surface, it will cause the rod to rotate, and with it, its attached valve. It will be noted that the plate or disk 38 at the top of shaft 30, and a similar element on the shaft 31, may move upwardly against the inclined arms 129, to force them outwardly against the action of the springs 131, which will snap the arms back to the full line position (see Fig. 17) when the plates or disks have moved to the upper curved surface of the arms. The arms will then catch under these disks and hold the valves shut until they are moved out of contact with the plates or disks.

In Figs. 19 and 21 is shown a flue system or a series of combustion chambers within the walls of the retort to provide a means for maintaining the temperature within the retort more uniform. A series of vertical passages 94 are united by transversely extending passages 92 and 93 through the agency of the smaller passages 95 and 96. At the top, the vertical passages 94 open into the transverse passages 97. This construction is shown more clearly in Fig. 21, which is the transverse section taken on the line 21—21. By supplying the heated gas to these passages, it is possible to maintain more uniform temperature conditions within the retort. If desired, an inflammable gas or liquid could be consumed within these passages to supply this heat.

The gate structure at the top of the retort is shown more clearly in Fig. 20. The space 24 at the top of the retort is in communication with the interior through openings in the gate 91 and the ports 21. The gate 91 is slidably mounted on the surfaces supplied with the openings 21, and moves with respect thereto through the agency of the hand-wheel 23 and the gear and rack 23'. Thus by manual operation, the relative size of the openings 21 may be varied to suit the desired conditions. The passages in the gates are so arranged that the openings 21 may be opened in sequence, until they are all open, if this is desired. It is, of course, evident that the gates may be made in numerous forms to suit a number of conditions, and that those illustrated in the drawings are merely by way of example.

The process carried out by means of this apparatus, is as follows:—Carbonaceous raw material is supplied to the retort until it is completely full, and combustion is started within the base portion in contact with the grates. As an alternative, I contemplate the heating of the base portion of the pile, near the grate, by means of the chambers and flues in the walls of the retort, should this be desirable. However, in the preferred precedure, combustion is started within the base of the pile and the evolved heated gases are permitted to travel upwardly through the pile or column. The maximum temperature occurs within the combustion zone immediately above the grate, and continues in a diminishing degree towards the top of the pile to the point where the temperature is approximately 300° F. It is within this zone that the extracting operation occurs. Above this point, the ascending gases are cooled, (by the fresh raw material fed), and those of a higher boiling point will condense in the cooler portions of the pile. The condensed oils and resins will then flow back through the column and be revolatilized. This refluxing action results in a fractional distillation within the column itself, and due to the condensation, causes a scrubbing or purifying and revolatilizing action. Thus uncracked oils and resins which volatilize at a higher temperature than is provided within the retort, flow into and become a portion of the residue or coke, and serve to enrich it by increasing its carbon content. During this operation, the cutter bar is slowly moving back and forth across the surface of the grate, to remove the material from the base of the pile or the bottom of the combustion zone in relative thin layers, and also to deflect and vary the direction of the streams of gas or gases admitted through the grate to support combustion. This removal in successive layers results in a stirring action at the base of the pile, and causes the residue to be broken up, as well as to aid in a proper and uniform heating of the fuel bed. The ejected residue falls into the hopper below the grate. This hot residue may be quenched by means of steam or water, and the evolved gases will travel up through the grate and through the combustion zone where they become superheated and aid in the distillation reactions, the presence of the steam resulting in the evolution of the volatile constituents at lower temperatures than would otherwise be the case. If desired, and it has been found of considerable value, any suitable gas or mixtures thereof may be supplied to the fuel bed or any point thereof, by means of the gas boxes placed just below the grates. These gases may be pre-superheated if desired, and aid in the reactions in the fuel bed to give a richer gas content. The tendency to channel may be somewhat overcome by controlling the point of admission of the gases to the fuel bed. When desired, some of the evolved gases may be returned to the gas boxes below the grates, rather than a gas from some foreign source. The resulting products are removed from the top of the pile by suction, and to aid in their removal, the gases supplied below the grate may be under sufficient pressure to create a desirable pressure within the combustion zone. This pressure may vary from one to ten pounds, but I do not desire to be limited to the particular pressure used, since any suitable pressure may be maintained within the combustion chamber. In order to further reduce the tendency to channel, the gases may be removed from the top of the retort at any vertical and horizontal point thereof, by means of the openings which may be controlled by the gates which cooperate therewith. When it is desirable, I also propose, in connection with my process, to burn a suitable fluid within the walls of the retort to maintain the temperature within the retort more uniform. When it is desired to enrich the volatile products secured by my process, I can increase the B. t. u. content thereof by returning a portion of the removed gases below the grates, so that this gas may combine with the freshly evolved gas to produce a richer mixture. This result may also be secured by supplying superheated steam below the grate. I have also found that the size of the coke or residue produced on the grates may be controlled by varying the distance between the grate and the base of the retort which may readily be accomplished by supporting the whole grate structure on jacks, so that it may be raised and lowered vertically.

As has been indicated somewhat in detail above, the continued operation of the cutter or slicer bar across the surface of the grates will cause the double hopper feed device to operate, so as to continuously supply fresh fuel to the top of the retort as the treated material is removed from the bottom.

It is an important feature of my invention that with such a condition of substantially continuous feed of raw material and ejection of fuel residue, due to the removal of successive increments from the bottom of the fuel bed and the replenishments, as above described, and with substantially uniform conditions of heat generation, of extraction or progression of the material through the retort or extraction chamber, as above explained, I am enabled to maintain a low maximum extracting temperature, for example, not to exceed approximately below 800° F., which is below the cracking temperature of the oil product of extraction. This maximum extracting temperature is maintained at or in the region where the mass of material to be treated rests upon or merges into the combustion zone. At this point the extraction action has been practically completed, and the condensible volatiles driven off and collected. That is to say, the volatile oils begin to be released from the material at the upper portion of the mass where the temperature is quite low, and the extraction action continues under conditions of gradually increasing temperature and pressure, due to the increasing weight and resistance of the flow of gases through the increased mass of the superincumbent material, and to its advance toward the combustion zone, as the material progresses through the chamber until the point of maximum extracting temperature is reached, and this maximum extracting temperature, which as above stated, is about 800° F., is attained when the extracting action is practically completed and the material passes into the combustion zone. Consequently, I am enabled to effect the extraction and recovery of the oil content of the material under treatment without effecting the chemical change in such products of extraction resulting from the passage of the gases and vapors evolved through zones of higher temperature than those at which they are originally freed from the raw carbonaceous material, and I thus avoid change in the chemical structure of these complex hydrocarbons into simpler forms and permanent fixed gases that, combined, have a less total value. I am thus also enabled to recover oil products having a different chemical structure than those which are obtained by other extraction processes in present common practice, and which would be chemically changed by the higher temperatures ordinarily employed, and therefore which in former practice are recovered, if at all, only in comparatively small volumes, in the subsequent refining processes to which the oil and other extraction product may be subjected.

I have found that not only are the extraction products, accomplished by the use of the apparatus of my invention, of the nature of oil products rather than tar products, but also that because of the low temperatures employed, and other reasons, including the pressures due to the weight and mass of the material under treatment, and to the manner and method of maintaining a combustion zone within the mass of material under treatment, that the resulting carbonaceous residue, particularly in the case of coals, forms a valuable fuel product, which is of greater heat value than the cokes made by other methods, now in common practice, from the same raw materials. This is an especially important feature of my invention in that I am not only enabled to accomplish commercially, practically and successively the extraction of the oil contents of coal of the higher volatile class, such for example as commercial cannel coal, but I am enabled to produce from such treatment of this class of coals a coke product which possesses a higher fuel value than that of the commercial coke produced in methods at present employed in commercial practice.

It will be observed that the heat required is generated from and or within the body of the material itself which is under treatment. I am therefore enabled to avoid the great expense and heat losses due to the use of outside sources of heat in carrying out the extraction operation. Where an outside source of heat is employed, and where extraction temperatures are required to be high, and are attained by conduction through the walls of the chamber in which the extraction is accomplished not only is there an enormous loss of heat sustained through the comparatively high temperature of the waste stock gases, which renders the extraction expensive, but there is a failure to attain uniformity in the extraction temperatures throughout the entire mass of material being treated in the various extracting zones, and the greater part of the volatile products evolved are subsequently unavoidably submitted to a temperature greatly in excess of that required for their evolution. These are practical difficulties encountered in many of the commercial plants at present in use and which my invention avoids.

By the use of the apparatus of my invention, I am enabled to effect a satisfactory extraction and recovery of the volatile constituents of carbonaceous material, and I have found the above described apparatus particularly effective in recovering such volatile products without materially changing their chemical structure from that incident to their evolution, when extracted or driven off from the raw material and delivered into the initial condensing, scrubbing and absorbing apparatus, the various gases, oils, and other products may be treated and refined according to any suitable, convenient or preferred well known refining operations for the recovery and commercial utilization of such gases, oils and other products.

I have now described in considerable detail, one form of apparatus and process embodying the principles of my invention, but I do not desire to be limited to the particular forms and methods disclosed by me by way of illustration, since I am well aware that many changes in the details of construction and arrangement of parts and method of procedure will occur to those skilled in this art. I therefore desire not to be limited to the specific disclosure herein, but rather to the invention as I contemplate it in the appended claims.

What I seek to secure by United States Letters Patent is:—

1. In the treatment of solid carbonizable fuels to extract gases therefrom, the method of preventing channeling comprising forming a column of fuel, maintaining a heated zone in said column at the base thereof to extract the volatile constituents thereof, supplying a gas at any of a plurality of desired points near the base of the column and removing the resultant gases products near the top of the column at a point which causes diffusion of the gases through the column in their upward travel.

2. The method of treating solid carbonizable fuels to extract the volatile constituents therefrom, comprising confining a mass of carbonizable fuel in a retort of gradually changing cross-sectional area, maintaining a heated zone in said carbonizable fuel of approximately 800° F. near the base of the mass, supplying a gas to said heated zone at any of a plurality of desired points and removing the resultant gases from the top of the mass at any of a plurality of desired points to prevent channeling.

RICHARD B. PARKER.